3,017,241
CATALYTIC OXIDATION OF ORES
Daniel Chalmers McLean, Springdale, Conn., assignor to American Cyanamid Company, New York, N.Y., a corporation of Maine
No Drawing. Filed May 7, 1959, Ser. No. 811,541
10 Claims. (Cl. 23—14.5)

This invention relates to the recovery of uranium from uranium ores or other uranium containing sources by the solution of the uranium values in a leach circuit in which the oxidation of uranium to a water soluble form with oxygen is completed using an iron-cyanide ion catalyst system. More particularly it relates to oxidation of uranium values using the ferricyanide ion and dissolved oxygen as the oxidizing system and regenerating the ferricyanide ion from the resultant ferrocyanide ion by using an oxygen containing gas, more particularly air; and to the in situ production of ferricyanide ion from a cyanide ion source such as a cyanide salt or certain organic nitriles and metallic iron or a soluble source of ferrous ions.

The importance of uranium is becoming better known. The problems of recovering uranium in a useful form from its ores has been the subject of much interest since the development of processes which render uranium a potent source of energy. There are very few ores which have a high concentration of uranium in them, but, on the other hand, uranium is a fairly common substituent of ores and accordingly the big problem is to develop reasonably effective processes for recovery of uranium from ores. Few ores run over 1% uranium, reported as $U_3O_8$, and ores below 0.1% uranium, reported as $U_3O_8$ are so poor as to be currently uneconomic, unless other values, such as gold, are simultaneously recovered.

Uranium most commonly occurs in a water insoluble state in its ores, frequently as uranium dioxide, $UO_2$ or as a mixed oxide, $U_3O_8$. As used in this application the term "uranium values" will be used to include not only the uranium dioxide but all other forms in which the uranium may be present, including the free metal and other oxides and salts. This is in accordance with common use in extractive metallurgy as the ore is classed as to the amount of the desired material independent of the form in which it may occur. The uranium present, unless otherwise stated, is reported as $U_3O_8$, which is current conventional practice. Similarly, the term "circuit" is used to refer to an extractive metallurgical process independent of whether a recycle or a once through system is used, or whether or not there are one or more regenerative circuits in the operation.

In the past it had been quite common to grind uranium ores, to increase the contact area between the uranium values in the ore and the extracting liquid and hence to render the uranium values more subject to attack, and solution.

Commonly the uranium values in the ore are dissolved in a solution and the residual gangue is discarded while the extract is treated to recover the uranium. The two most common systems have been an aqueous alkaline circuit in which a mixture of sodium bicarbonate and sodium carbonate is used in the extraction, and the other an aqueous acid circuit in which an acid, usually sulphuric acid, is used to dissolve the uranium values.

For effective recovery it is necessary that all of the uranium in the ore, or other material, be oxidized to the hexavalent state in which state the uranium values are comparatively soluble in either an acid or alkaline leach circuit. The acid leach circuits are frequently used with ores which contain a low concentration of acid consuming gangue, such as limestone, and oxidation has been accomplished with chlorates, such as sodium chlorate, ferric iron, manganese dioxide, etc.

Alkaline circuits are more commonly used for ores which contain limestone or other acid consuming compounds. Although other carbonates may be used, a mixture of sodium carbonate and sodium bicarbonate is usually used for the extraction. In the alkaline solutions, oxidizing agents such as potassium permanganate or copper sulphate with ammonium hydroxide, usually added as ammonia gas, have been used.

The soluble ferricyanides, such as the alkali ferricyanides, sodium ferricyanide and potassium ferricyanide, are extremely effective oxidizing agents on a theoretical basis. From a practical standpoint their cost has been such as when used in stoichiometric quantities the cost has been excessive. From 20 to 80 pounds per ton of ore, depending on the grade of ore, are required for stoichiometric oxidation. Processes of oxidizing the ferrocyanide ion in the solution with oxidants such as sodium hypochlorite or chlorine have not met with commercial favor.

Similarly, on a theoretical basis it has been found that oxygen, as a gas, including the oxygen in air, will oxidize the uranium to a soluble state. In a laboratory procedure on a small scale with highly effective aeration procedures such oxidation is reasonably effective. In larger quantities, such as mill circuits, oxidation with air, oxygen as a gas, or an oxygen containing gas has been impracticably slow.

It has now been found that by adding a soluble ferricyanide to the system in catalytic quantities, oxygen or air, or other oxygen containing gas, may be used as the oxidizing agent, and oxidation accomplished expeditiously and economically. Air is usually the most economical. Low purity oxygen, where available, gives excellent results. Furthermore, whereas the ferricyanide may be added as a soluble salt, including but not limited to, sodium ferricyanide, potassium ferricyanide, calcium ferricyanide, strontium ferricyanide, ferrous ferricyanide, ferric ferricyanide, manganese ferricyanide, copper ferricyanide, zinc ferricyanide, cobalt ferricyanide, etc. it is usually more convenient and economical to form the soluble ferricyanide in the circuit from low cost raw materials such as the soluble ferrocyanides, including but not limited to, ammonium ferrocyanide, sodium ferrocyanide, potassium ferrocyanide, calcium ferocyanide, etc.

The ferricyanide may be formed in situ from soluble cyanides including alpha-hydroxy nitriles.

It has long been regarded as impractical to oxidize a cyanide or ferrocyanide to the ferricyanide ion with air. Such textbooks as "The Chemistry of the Ferrocyanides," American Cyanamid Company, 30 Rockefeller Plaza, New York 20, New York, 1953, Beacon Press Inc., New York, at page 33 states that "It should be noted that oxidation of alkaline or neutral solutions of ferrocyanides in the absence of light has not been observed." It is therefore very unexpected to find that under the conditions of commercial ore recovery, soluble cyanides may be used as a source of the ferricyanide ion used as a catalyst.

The cyanides and ferrocyanides are rapidly and quantitatively oxidized to ferricyanide under the uranium pulp treatment conditions by oxygen dissolved in the system by air agitation.

In reducing the ores to a finely subdivided state in which they can be extracted various grinding means must be used. Usually and conveniently these are ball mills or rod mills in which either the grinding media or the apparatus itself or both are iron; and from about one to about two pounds of iron per ton of ore from the grinding media is consumed in the size reduction. This iron is released in finely divided active form in the circuit.

Such iron together with iron present as oxides or salts in the ore and other components present in the ore reacts with the cyanide ion, which may be added before or after the grinding, to yield at room temperature or at elevated temperatures, with air and agitation, the soluble ferricyanide ion.

Either pure or crude cyanides or alpha-hydroxy nitriles may be used. In theoretical studies or small laboratory scale operations, the cyanide may be conveniently added as sodium cyanide or a potassium cyanide in pure form. In plant scale operation it is more convenient to use the more economical calcium cyanides. These are frequently available in a somewhat impure form containing not only calcium cyanide but a certain amount of calcium oxide and some sodium chloride. Such materials are usually a more economical source of cyanide than the more highly purified materials. Inasmuch as the soluble cyanide salts dissociate in aqueous solutions, and water is present for the extraction, and usually used in the grinding, after the cyanide is added dissociation occurs, and the cationic component is immaterial. More expensive cyanides such as lithium cyanide, barium cyanide, strontium cyanide, ammonium cyanide, etc. are effective but from an economic standpoint the cheaper calcium cyanide is a starting material of choice. Where available, the cyanide may be added as hydrogen cyanide. In solution, the cyanide ions are released, and buffer capacity disposes of the hydrogen ions.

Other cyanide sources which may be used include the soluble alpha-hydroxy nitriles such as lactonitrile, alpha-hydroxy isobutyronitrile glycolonitrile, and mandelonitrile. Other alpha-hydroxy nitriles could be used but as the nitrile increases in molecular weight, the CN content becomes a smaller percentage and hence a larger quantity is required without any corresponding advantage.

It is an advantage of the present invention that the alpha-hydroxy nitriles do not have to be pure and accordingly crude lactonitrile (alpha-hydroxy propionitrile) can be used. Such byproduct nitriles are often obtainable at a low cost and hence are preferable for economic reasons. At present lactonitrile is commercially economically available. With changes in technology other alpha-hydroxy nitriles may become competitive in price. It is surprising that the nitrile group of an organic compound is so readily available in a form which appears to be substantially equivalent to the inorganic cyanides.

It is another phase of the present invention that cyanides may be readily converted to the more expensive ferricyanides by oxidation with air in the presence of the extremely finely divided and active iron containing solutions which occur in grinding processes. It may well be that the surface energy associated with the formation of more iron water interfaces releases energy for a reaction which could not otherwise occur. It may be that vanadium oxides, and other catalytic material in them would aid in speeding the reaction. It has been found that in spite of a considerable body of literature to the contrary this oxidation does occur.

The chemistry of the cyanides and particularly of the ferrocyanides and the ferricyanides is rather obscure. Even though certain of these cyanides have been used as dyestuffs or pigments for many years the phenomena associated with the reactions involved have not been fully understood.

Inasmuch as the ferricyanide ion can cause stoichiometric oxidation as well as catalytic oxidation, it can be seen that large quantities may be used. For greatest economy, however, it is desired that the consumption of the cyanide reagent be kept at a minimum. A consumption of less than one pound of sodium cyanide, or the equivalent stoichiometric amounts of other cyanides, is effective when used in the presence of dissolved oxygen. 1/24 of the stoichiometric amount of a ferricyanide added to the circuit accomplishes complete oxidation.

The same amount of ferrocyanide is equally effective inasmuch as the ferricyanide is formed from ferrocyanide at such a rate, with air agitation, in commercial practice, that the presence of ferrocyanide ion cannot be detected in the pregnant liquors, even when added as such.

The oxidation readily occurs at room temperature, at from less than 50° F. in the cold climates up to over 100° F. in warmer climates. The oxidation and leaching may be expedited by heating the leach liquor, as the oxidation and dissolution of the uranium is expedited at higher temperatures and, additionally, the reduction in the viscosity of water speeds the separation of the aqueous leach liquor from the residual gangue.

The extraction accomplished with the aid of oxygen with ferricyanide as a catalyst, can be accomplished under the usual conditions currently used in the recovery of uranium values although it may also be used under a much wider range of operations. The amount of grinding of the ore varies to a considerable extent depending upon the type of ore. Where the distribution of uranium values is in larger particles a comparatively coarse grind may be used. A grind to minus 65 mesh with about 55% minus 200 mesh is quite common. The grind must be fine enough to that the uranium values are exposed to attack by the oxidizing and leach solution.

Similarly, the concentration of solids in the leach circuit may vary widely. Extraction is frequently obtained with a workable solution with 50% of ore solids by weight. Ores can be expediently handled and extracted at concentrations as high as 70% by weight of ore solids. At higher concentrations the ore leach circuit becomes too thick to be handled readily and below 50% the volume of leach liquor is larger than is most economical. However, both of these limits can be varied depending upon the ore being used. Usually operations outside of these limits are not as economical as operations within them.

The leaching may be accomplished at from room temperature up to the point at which water no longer remains liquid. Inasmuch as both oxidation and extraction occur readily at higher temperatures and as the solution has a low viscosity and is easier to handle, leaching commonly is accomplished at from about 70° C. to 90° C. If pressure facilities are available temperatures of above 100° C. are very effective. With the ferricyanide catalyst, oxidation is accomplished at lower temperatures than had previously been used, thus saving in fuel costs.

The time of leaching for optimum results depends on the temperature, the fineness of grind, the type and characteristics of the ore, and the concentration of reactants. Commercial practice usually calls for 48 hours or more at the lower temperatures and 24 hours or less at the higher temperatures, with the minus 65 mesh ore abovementioned. At high temperatures, at about 100° C. to 120° C., and with a finely divided ore a time as short as 6 hours will allow effective recovery of the uranium values, and with free milling ores an even shorter time may be used.

Inasmuch as once the extraction and complete oxidation of all reactants in the pulp has occured, the system is stable, the leached material may be allowed to stand indefinitely before the separation of the leach liquor from the ore without loss of uranium recovery. Usually a leaching time of over 60 hours is uneconomic because of the volume of storage tanks required. Additionally, when held for longer periods at higher temperatures the ferricyanide has a tendency to decompose to form formates and ammonia. Above 250° F. the decomposition becomes excessive. Hence, the shorter time and lower temperature figures are preferred to reduce cyanide consumption, as the barren liquor containing the ferricyanide is recycled.

The leach circuit used in alkaline extractions usually has a pH of around 9.5 to 10.5 although operations outside of these limits can be accomplished. At this pH and a temperature of less than 90° C. and a time of not greater than 48 hours the addition of from 1/4 pound to 2 pounds of cyanide calculated as sodium cyanide per ton of ore gives a very effective extraction. It is convenient to add the cyanide in its most economical form which is usually a crude calcium cyanide, which may contain sodium chloride and calcium oxide. One such material commercially available from the American Cyanamid Company is sold as "Aero Brand Cyanide." Such cyanides are usually calculated on the basis of the sodium cyanide equivalent and the weight added adjusted on this basis.

In alkaline systems the leach liquid itself may have about 60 grams per liter of sodium carbonate (120 pounds per ton of solution) and 15 grams per liter of sodium bicarbonate ($NaHCO_3$) (30 pounds per ton of solution. Concentrations of from less than one half to over twice these values give good extractions.

To avoid the consumption of large quantities of leach liquor, in mill practice the leach liquid is usually treated to remove the dissolved uranium and then recycled as a barren liquor. After the separation of the ore from the leach liquor, the ore is washed with water to recover the leach liquor which contains uranium values. The washing is usually counter current, and at least the more concentrated of the wash liquors are added to the barren solution for make up.

The uranium may be removed from the leach liquor by ion exchange resins. It is also conveniently removed by adding sodium hydroxide to a pH of about 12 at which point the uranium values precipitate as what is known to the industry as "yellow cake" as is conventional in the industry. This yellow cake is then filtered from the liquor, yielding a barren liquor at pH 12. Boiler gas from the combustion of carbonaceous fuels is passed through the leach liquor. Carbon dioxide is absorbed, neutralizing the caustic, thus regenerating the desired carbonate-bicarbonate leach liquor, and lowering the pH. Such a recycle system conserves cyanide, other chemicals, water, and reduces the problem of waste disposal.

The regenerated leach liquor is conveniently added to the ore before the ore is ground so that the grinding is accomplished in the presence of the leach liquor. Such a cycle reduces the problems of handling of the ore, as dusting is prevented, and wet grinding is comparatively economical. The iron in the balls or rods and the grinding chamber reacts with added cyanide during the milling. Iron is released in an active form which rapidly reacts with the cyanide ion present to yield the desired ferricyanide. The agitation in the grinding circuits gives the solution enough oxygen to aid in the oxidation of ferrocyanide to ferricyanide which is used as the catalyst. Additionally, during the grinding operation itself some oxidation of the uranium values is accomplished even before the ore is passed to the leach tanks. Fluidizing and flocculating agents such as polyelectrolytes including the polyacrylamides are effective in expediting the filtering and settling operations in the leaching.

Such description of the operations is exemplary of current practice in the uranium fields but does not cover the entire operable range as of course only the most economical circuit is used in any one mill and the conditions for the most economical operation varies somewhat depending upon the type of ore and other factors. A very effective recovery of uranium values may be accomplished conveniently outside of the most economic limitations. In certain operating conditions it is found that the addition of ½ pound per ton of ore of cyanide calculated as sodium cyanide reduces the uranium, as $U_3O_8$, in the tailings by .01% which in addition to reducing processing costs gives an additional recovery of uranium of about 4 to 6% of that present. It is thus seen that in addition to the convenience and cheaper cost of air as the oxygen source, using ferricyanide ion as a catalyst, an increased recovery of uranium from the ore is obtained, and the reduction in the amount of uranium loss in the tailings is more than sufficient to pay for the cost of the cyanide consumed.

As illustrative of operations the following examples, some of which are on a plant scale and some of which are on a laboratory scale, illustrate the present invention although they do not illustrate the entire range of operable conditions:

*Example 1*

An ore containing 0.2% of uranium values as $U_3O_8$ is crushed and then ground in a ball mill at 50% solids with a leach liquor containing 60 grams per liter of sodium carbonate and 15 grams per liter of sodium bicarbonate. 1500 tons per day of ore is ground to minus 65 mesh, with approximately 55% of minus 200 mesh. Approximately 1 pound per ton of ore of crude calcium cyanide (½ pound per ton of sodium cyanide equivalent) is added to the leach liquor as the material is fed to the ball mill. The calcium cyanide is added as a dry black flake. The pulp is digested at 200° F. 60 pounds per square inch gauge air is fed to the bottom of each of eight tanks at the rate of 30 standard cubic feet per minute per tank. After agitation for 8 hours through the series of 8 tanks (one hour holding time per tank), the leached ore is separated from the leach liquor, and the leached ore is washed with about 20% of its weight of water, in 3 stages, countercurrently. The leached tails contain approximately 0.015% uranium as $U_3O_8$.

The leach liquor and makeup washings are treated with sodium hydroxide to a pH of 12 and the yellow cake removed by filtration. The filtered barren solution is treated with boiler stack gas from an oil fired boiler until the pH drops to about 10. The barren solution is thus both heated and regenerated, and fed again with fresh ore to the grinding mill.

*Example 2*

In a mill similar to that described in Example 1, 1 pound per ton of sodium ferrocyanide

is added to the digesters. After the ore is ground, the digestor is operated at 200° F. and 60 pounds per square inch pressure and 30 cubic feet per minute of air agitation, and a retention time of seven hours as described in the preceding example. The tailings with air alone as oxidant were found to range from 0.024 to 0.030% $U_3O_8$, the tailings with cyanide were found to run as low as 0.007% $U_3O_8$. A small amount of ferricyanide was found to be coming through in the tails (about ⅓ was thus recycled). No ferrocyanide is found to be present. Therefore it is seen that all of the ferrocyanide is converted to ferricyanide and the catalytic action markedly reduces the uranium in the tails.

*Example 3*

To a ground uranium pulp at 50% solids in which the liquid phase contained 50 grams per liter $Na_2CO_3$ and 10 grams per liter $NaHCO_3$, 1.5 pounds sodium ferrocyanide was added in the form of yellow prussiate of soda ($Na_4Fe(CN)_6 \cdot 10H_2O$) per ton of ore. The pulp was leached for a total period of 60 hours in a series of Pachuca tanks which are agitated with a large excess of air. The uranium tailings resulting from this treatment contain 0.012% $U_3O_8$.

It is found that it takes approximately 10 days' operation for the cyanide circuit to build up to maximum effectivity even though the amount of ferricyanide found in the circuit is low. In one typical run no ferrocyanide was found and the ferricyanide was found to be about 0.75 gram per liter in the over flow of the first leach tank, about 0.5 gram per liter from the second and third tanks, about 0.25 gram per liter from each leach tank 5 and 6 and only a very slight trace from tank 7.

*Example 4*

In a laboratory run a rod mill is operated at 50% solids and a leach liquor containing 60 grams per liter of sodium carbonate and 15 grams per liter of sodium bicarbonate. The ore is ground to minus 65 mesh. Within 20 minutes 1 pound per ton of ore of added sodium cyanide is converted, at 35° C., to ferricyanide. When the pulp is held at 83° C. for 24 hours with air agitation the tailings are found to have about 0.012% uranium as $U_3O_8$.

Similar results were obtained with each of 1 pound per ton of calcium cyanide and 1 pound per ton of alpha-hydroxy propionitrile (lactonitrile).

*Example 5*

In a mill run 0.5 pound per ton of ore of sodium ferrocyanide were added to the ore as the ore was fed to the grinding mills. The ferricyanide formed carried through to the end of the leach circuits and reduced the uranium in the tailings to about 0.012% $U_3O_8$.

*Example 6*

Sodium ferricyanide at 3 pounds per ton of ore was added to a uranium ore solution which was extracted at 180° F. in atmospheric pressure with air agitation and a 24 hour leach period. The uranium extract was 94% of the uranium in the ore.

I claim:

1. The process of catalytically oxidizing uranium dioxide in a uranium ore in an alkaline carbonate leach circuit to a water soluble form of uranium which comprises agitating finely divided uranium ore in aqueous suspension, and adding thereto oxygen in the gaseous form, in the presence of a catalytic quantity of soluble ferricyanide ions, the total amount of cyanide in the solution being not greater than two pounds of cyanide calculated as sodium cyanide per ton of ore.

2. The process of catalytically oxidizing uranium dioxide in a uranium ore in an alkaline carbonate leach circuit to a water soluble form of uranium which comprises agitating finely divided uranium ore in aqueous suspension, and adding air thereto in the presence of a catalytic quantity of soluble ferricyanide ions, the total amount of cyanide in the solution being not greater than two pounds of cyanide calculated as sodium cyanide per ton of ore.

3. In a method of oxidizing uranium values in uranium ores to a water soluble form in an aqueous alkaline carbonate leach circuit, by reacting the uranium values with oxygen gas in a reaction vessel under a positive partial pressure of oxygen, the improvement which comprises conducting the oxidation in the presence of a catalytic quantity of ferricyanide ion dissolved in the solution, the total amount of cyanide in the solution being not greater than two pounds of cyanide calculated as sodium cyanide per ton of ore, and continuing the oxidation for a period of time sufficient to oxidize the uranium values to a water soluble form.

4. The method of claim 3 in which the oxygen is supplied as air, and the pressure is atmospheric.

5. In a method of oxidizing uranium values in uranium ores to a water soluble form in an aqueous alkaline carbonate leach circuit, by reacting the uranium valves with oxygen from air in a reaction vessel, the improvement which comprises conducting the oxidation in the presence of a catalytic quantity of ferricyanide ion produced from a soluble cyanide ion and finely divided iron dissolved in the solution, the total amount of cyanide in the solution being not greater than two pounds of cyanide calculated as sodium cyanide per ton of ore, and continuing the oxidation for a period of time sufficient to oxidize the uranium values to a water soluble form.

6. The method of claim 5 in which the cyanide ion is introduced as a member of the group consisting of sodium cyanide, potassium cyanide, calcium cyanide, strontium cyanide, ammonium cyanide, sodium ferrocyanide, lactonitrile, alpha-hydroxy isobutyronitrile, glycolonitrile and mandelonitrile.

7. The process for producing ferricyanide ions in situ which comprises introducing gaseous oxygen into a uranium ore pulp in an aqueous alkaline carbonate leach circuit containing a catalytic quantity of a cyanide ion source, the total amount of cyanide in the solution being not greater than two pounds of cyanide calculated as sodium cyanide per ton of ore, selected from the group consisting of cyanide ions, ferrocyanide ions, and alpha-hydroxy nitriles, in the presence of iron salts.

8. The process of catalytically oxidizing uranium values in uranium ores to a water soluble form to recover the same in an aqueous alkaline carbonate leach circuit which comprises grinding a uranium ore with an aqueous alkaline carbonate leach liquor at from 50% to 70% ore solids by weight in a grinding mill, at least part of which consists of iron, at a pH of between about 9.5 and 10.5 at a temperature of less than 90° C. and having present during the grinding from one-quarter to two pounds of cyanide calculated as sodium cyanide from the group consisting of sodium cyanide, potassium cyanide, calcium cyanide, strontium cyanide, ammonium cyanide, sodium ferrocyanide, lactonitrile, alpha-hydroxy isobutyronitrile, glycolonitrile and mandelonitrile, per ton of ore, with air being present during the grinding operation, thereby catalytically oxidizing the uranium values to a water soluble form, separating the leach liquor from the ore solids and recovering the uranium values from the leach liquor.

9. The process of catalytically oxidizing uranium values in uranium ores to a water soluble form in an aqueous alkaline carbonate leach circuit which comprises grinding a uranium ore in a grinding mill, at least part of which consists of iron, and having present during the grinding from one-quarter to two pounds of cyanide calculated as sodium cyanide from the group consisting of sodium cyanide, potassium cyanide, calcium cyanide, strontium cyanide, ammonium cyanide, sodium ferrocyanide, lactonitrile, alpha-hydroxy isobutyronitrile, glycolonitrile and mandelonitrile, per ton of ore, with air being present during the grinding operation, thereby catalytically oxidizing the uranium values to a water soluble form.

10. In the process of extracting uranium from its ores by solution of uranium in an alkaline carbonate leach circuit, including the step of oxidation by gaseous oxygen of the uranium to the soluble hexavalent state, the combination therewith of the step of adding, in the presence of finely divided iron, a source of cyanide ions in catalytic quantity, not greater than two pounds of cyanide calculated as sodium cyanide per ton of ore, in a form which is soluble in the leach circuit.

References Cited in the file of this patent

UNITED STATES PATENTS

| | | |
|---|---|---|
| 1,318,258 | Boberg | Oct. 7, 1919 |
| 1,872,929 | Gluud et al. | Aug. 23, 1932 |
| 2,815,263 | Eldredge | Dec. 3, 1957 |
| 2,950,951 | Sherk | Aug. 30, 1960 |

OTHER REFERENCES

AEC Document RMO–2617 March 31, 1955, pp. 17–20, 28 and 29. (Copy in Scientific Library.)

AEC Document RMO–2621 June 13, 1956, pp. 1–7. (Copy in Scientific Library.)

UNITED STATES PATENT OFFICE
CERTIFICATE OF CORRECTION

Patent No. 3,017,241                        January 16, 1962

Daniel Chalmers McLean

It is hereby certified that error appears in the above numbered patent requiring correction and that the said Letters Patent should read as corrected below.

Column 5, line 12, after "solution" insert a closing parenthesis; column 7, line 56, for "valves" read -- values --.

Signed and sealed this 8th day of May 1962.

(SEAL)
Attest:

ERNEST W. SWIDER                                DAVID L. LADD

Attesting Officer                                     Commissioner of Patents